June 22, 1948.    M. H. ALLDREDGE    2,443,712
METHOD OF MAKING TIE ROD SOCKET ASSEMBLIES
Original Filed March 4, 1944
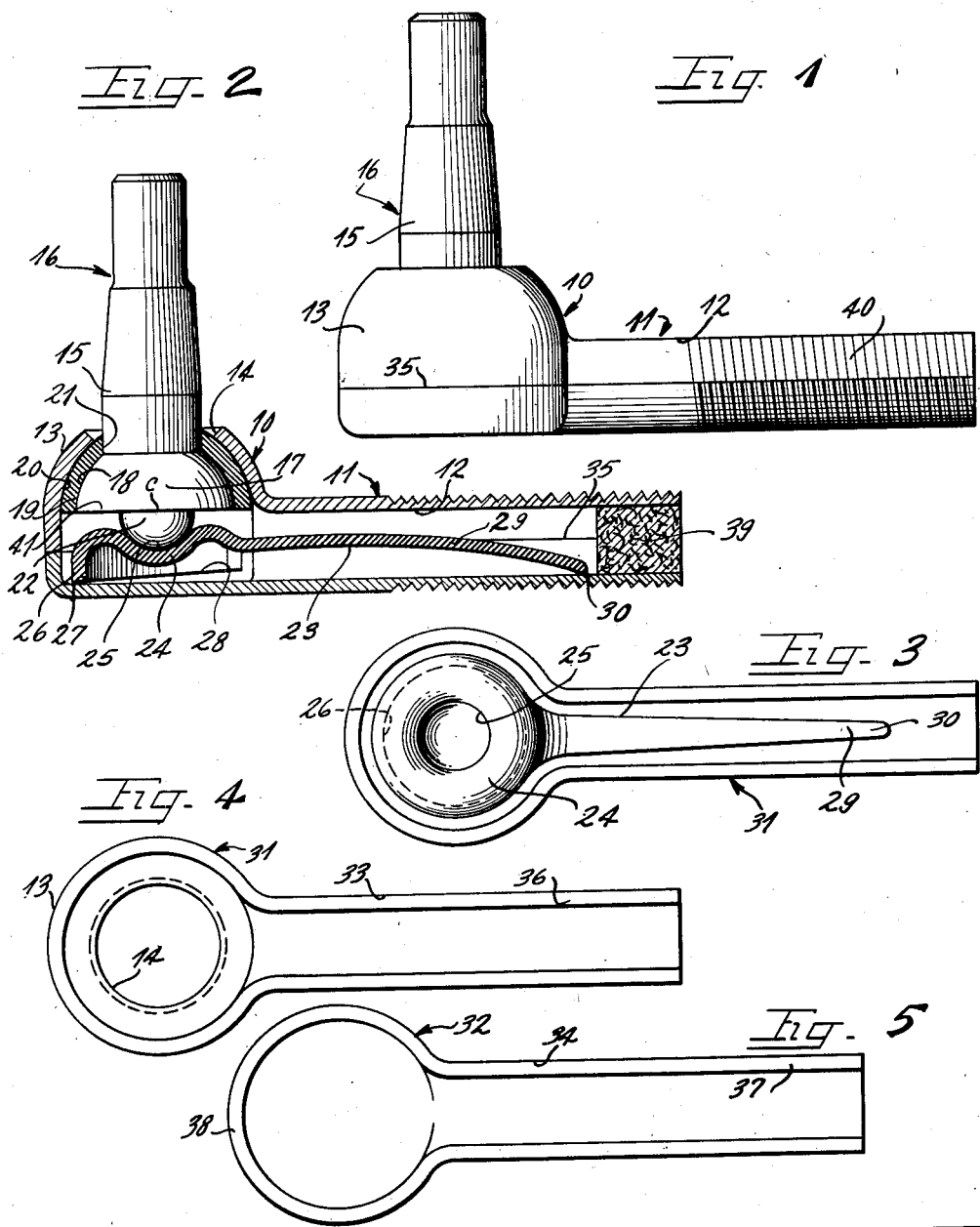
Inventor
Marshall Homer Alldredge
by The Firm of Charles H. Hill Attys.

Patented June 22, 1948

2,443,712

UNITED STATES PATENT OFFICE 2,443,712

METHOD OF MAKING TIE ROD SOCKET ASSEMBLIES

Marshall Homer Alldredge, Detroit, Mich., assignor to Thompson Products Inc., Cleveland, Ohio, a corporation of Ohio Original application March 4, 1944, Serial No. 525,039. Divided and this application April 16, 1945, Serial No. 588,576

4 Claims. (Cl. 29—152)

This invention relates to a method of making a tie rod socket assembly.

In accordance with the present invention, a tie rod end housing is formed from a pair of metal stampings provided with longitudinally extending mating edges, which, after the ball stud, ball seat and spring have been inserted in place, are welded together to complete the assembly. The shank portion of the end housing is then tapped threaded externally for engagement with the end of the tie rod proper. By virtue of this construction, the cost of producing tie rod end assemblies is greatly reduced over the cost of manufacturing tie rod end assemblies of the forged or stamped types heretofore in common use. In particular, the present construction permits the use of an elongated stamping to serve as the spring for urging the ball of the ball stud, the ball seat and the associated part of the housing into constant bearing relationship. Such a spring element can be more inexpensively manufactured than the usual coiled spring that is conventionally used for this purpose.

It is therefore an important object of this invention to provide a comparatively simple and inexpensive method of making and assembling tie rod ends, in accordance with which the tie rod end socket or housing is formed from complementary metal stampings the mating edges of which extend longitudinally of the shank of the housing, whereby an elongated stamped spring element can be employed in place of the conventional coiled spring for holding the ball, ball seat and conforming portion of the housing wall in proper bearing relationship.

Other and further important objects of the invention will become apparent from the disclosures in the specification and the accompanying drawings.

On the drawings:

Figure 1 is an elevational view of the completed tie rod end assembly embodying the principles of my invention.

Figure 2 is a longitudinal sectional view of the tie rod end assembly illustrated in Figure 1, with the ball stud in elevation.

Figure 3 is a top plan view of the lower stamping with the spring element in position, prior to assemblage of the two complementarily formed stampings comprising the tie rod end housing.

Figure 4 is a plan view of the upper stamping, and

Figure 5 is a plan view of the lower stamping.

The reference numeral 10 (Figures 1 and 2) indicates generally a tie rod end assembly embodying the principles of my invention. Said tie rod end assembly includes a housing 11 having a cylindrical shank portion 12 and a segmental spherical portion 13 at one end of said shank portion. Said segmental spherical portion 13 is apertured, as at 14, to permit the extension therethrough of the shank 15 of a ball stud 16, the ball end 17 of which is positioned within said segmental spherical housing portion 13.

The ball end 17 of the ball stud 16 is provided with a segmental spherical surface 18, which constitutes the bearing surface of the stud during swivelling movement about its axis. A pair of bearing seats 19 is adapted to be positioned between said segmental spherical surface 18 and the inner segmental spherical wall 20 of the housing portion 13. Said bearing seats 19 extend at their upper ends into contact with the neck of the ball stud shank 15, as at 21 so that tilting movement of the stud 16 is accommodated through relative movement between the contacting surfaces of the seats 19 and segmental spherical socket portion 13. There is thus a separate pair of bearing surfaces for tilting movement of the stud 16 and a separate set of bearing surfaces for swivelling movement of said stud 16. The aperture 14 in the segmental spherical portion of the housing 13 is sufficiently large to provide the necessary amount of clearance as the ball stud 16 is tilted. Also, in accordance with my present invention, the center of tilting movement of said stud 16, which is indicated at C, is sufficiently high within the segmental spherical socket portion 13 to insure a sufficient area of bearing contact between the ball seats 19 and inner socket wall 20 throughout the full extent of the tilting action to which the stud 16 may be subjected in use.

The segmental ball portion 17 of the stud 16 is provided with a lower plane surface 41 from which projects a smaller segmental spherical seating portion 22. Said segmental spherical seating portion 22 is adapted to cooperate with a spring seat 23 of novel construction.

Said spring seat 23 may suitably be formed of relatively thin, resilient sheet metal, as by stamping, to provide a dished portion 24 having an upper wall 25 conforming in curvature with the segmental spherical seating portion 22 of the stud. A downwardly turned flange 26 partly surrounds said dished portion 24 and provides a point of contact, as at 27, with the lower inner wall of the housing 11. To insure substantially a single point of contact, such as the point 27, the lower edge 28 of said flange 26 is sloped upwardly away from said point 27. On the other side of the dished portion 24 from the point 27, the spring member 23 is provided with an elongated bowed extension 29, the end 30 of which is adapted to rest upon the inner wall of the shank portion 12 of the housing. The spring seat 23 thus rests against the wall of the housing at widely spaced points, such as points 27 and 30, whereby a considerable amount of spring action can be realized through the inherent resiliency of bowed portion 29. Said bowed portion 29 is tapered lengthwise (Figure 3) so that its edges converge toward the extremity 30.

The tie rod end housing 11, in accordance with my present invention, is formed of complementary metal stampings, a stamping 31 constituting the upper portion of the housing and a stamping 32 constituting the lower portion of the housing. The stampings 31 and 32 are preferably, although not necessarily, so formed that the line of their mating surfaces 33 and 34, respectively, when assembled, lies in a median plane passing through the shank portion 12. This is best illustrated in Figures 1 and 2 by the parting line 35, which is also the line of weld as will later be described.

The upper stamping 31 is provided with a semi-cylindrical shank portion 36 and with a segmental spherical end portion that constitutes the portion 13 already described. The lower stamping 32 includes a segmental cylindrical shank portion 37 and a shallow segmental cylindrical portion 38 with its axis at right angles to the axis of the shank portion 37. Said shallow segmental cylindrical portion 38 mates with the lower cylindrical wall of the segmental spherical porton 13 of the upper stamping 31.

In assemblying the tie rod end of my invention, the seats 19 are inserted inside the segmental spherical portion 13 of the upper stamping 31 and the shank 15 of the ball stud 16 passes through the aperture 14 to bring the ball portion 17 into contacting engagement with said seats 19. The spring seat 23 is then laid in the lower stamping 32 and the two stampings 31 and 32 brought into mating relationship with respect to their mating edges 33 and 34, respectively. This act of mating the two stampings places the spring seat 23 under load, so that the stamping sections must be temporarily held while being welded along the parting line 35. The welding is effected in any suitable manner, as by butt welding. After the welding is completed, grease may be introduced into the interior of the completed housing 11 to lubricate the joint. A plug 39 is then inserted in the open end of the shank portion 12 to prevent the grease from leaking out of the housing.

Prior to filling the housing with grease and inserting the plug 39, the shank portion 12 may be provided with external threads 40 for engagement with the usual threaded end of the tie rod proper (not shown). Two tie rod ends, similar to the tie rod end 10, will ordinarily be used with each tie rod, one at each end thereof.

It will be apparent from the foregoing description that I have made it possible by the provision of housing sections mated longitudinally of the shank portion of the tie rod end socket to use a spring seat of the novel construction shown. An elongated spring seat such as the stamping 23 could not ordinarily be used in a conventional type tie rod end since there would be no way of inserting the spring seat in place. However, with a construction as illustrated, it is a relatively simple matter to assemble the spring seat 23 within the housing and to weld the housing section together with the spring in a preloaded condition. The amount of preloading may, of course, be varied to suit specifications. Once assembled, the spring seat 23 holds the ball end 17, ball seats 20 and inner wall of the segmental spherical housing portion 13 in proper bearing relationship during continued use of the tie rod end.

This application is a division of my pending application Serial No. 525,039, filed March 4, 1944.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. The method of making a tie rod socket assembly, which comprises forming complementary stampings having mating edges, one of said stampings having a segmental cylindrical shank portion and a segmental cylindrical socket portion with its axis at right angles to the axis of said shank portion, the other of said stampings having a segmental cylindrical shank portion and a segmental spherical socket portion provided with an opening on an axis perpendicular to the axis of said shank portion, assemblying bearing seats and a ball end of a stud in said segmental spherical portion with the shank of said stud passing freely through said opening, positioning a stamped elongated bowed spring seating member in the first named one of said stampings with a seating portion thereof in said segmental cylindrical socket portion and with a spaced portion thereof in contact with said segmental cylindrical shank portion of said one stamping, and uniting said stampings along said mating edges with said elongated spring seating member under load to urge said ball against said bearing seats.

2. The method of making a joint assembly, which comprises forming complementary stampings adapted to mate along longitudinally extending edges to provide a housing having a segmental spherical cylindrical end socket and a cylindrical shank portion, said segmental spherical end socket having a circular opening the axis of which is perpendicular to the axis of said shank portion, forming a stud having a segmental spherical ball and a shank extending therefrom, forming segmental spherical bearing seats for cooperation with said ball and said shank, stamping an elongated bowed spring seating member providing a seating portion at one end for said ball and a bowed end portion extending therefrom, assemblying said bearing seats and ball in the segmental spherical portion of said end socket of one stamping with said shank extending through said opening, assemblying said seating member in said other stamping with its seating portion in the cylindrical portion of the socket end thereof and with said bowed end portion in the cylindrical shank portion thereof, and uniting said stampings along their mating edges to preload said spring seating member and cause the same to urge said ball, bearing seats and segmental spherical socket portion into close bearing relationship.

3. The method of making a joint assembly, which comprises forming a pair of complementary stampings having mating edges, forming one of said stampings to provide a segmental spherical cylindrical end socket, forming a circular opening in said spherical end socket, assembling bearing seats and a ball end of a stud in said segmental portion with the shank of said stud passing freely through said opening, providing in the other of said stampings resilient seating means for the ball end of said stud, and bringing said stampings into mating relation with said resilient means under load to urge said ball against said bearing seats.

4. The method of making a tie rod socket assembly, which comprises forming complementary stampings having mating edges, one of said stampings having a segmental cylindrical shank portion and a segmental cylindrical socket portion, the other of said stampings having a segmental cylindrical shank portion and a segmental spherical socket portion provided with an opening, assembling bearing seats and a ball end of a stud in such segmental spherical portion, the shank of said stud passing freely through said opening, positioning resilient means in the first named of said stampings with a seating portion thereof in said segmental cylindrical socket portion, and uniting said stampings along said mating edges with said resilient seating member under load to urge said ball against said bearing seats.

MARSHALL HOMER ALLDREDGE.

REFERENCES CITED

The following references are of record in the file of this patent:

UNITED STATES PATENTS

| Number | Name | Date |
| --- | --- | --- |
| 1,913,459 | Skillman | June 13, 1933 |
| 1,940,258 | Lautz | Dec. 19, 1933 |
| 2,005,004 | Ped | June 18, 1935 |
| 2,054,082 | Hufferd | Sep. 15, 1936 |
| 2,216,338 | Busse | Oct. 1, 1940 |